United States Patent Office 3,078,069
Patented Feb. 19, 1963

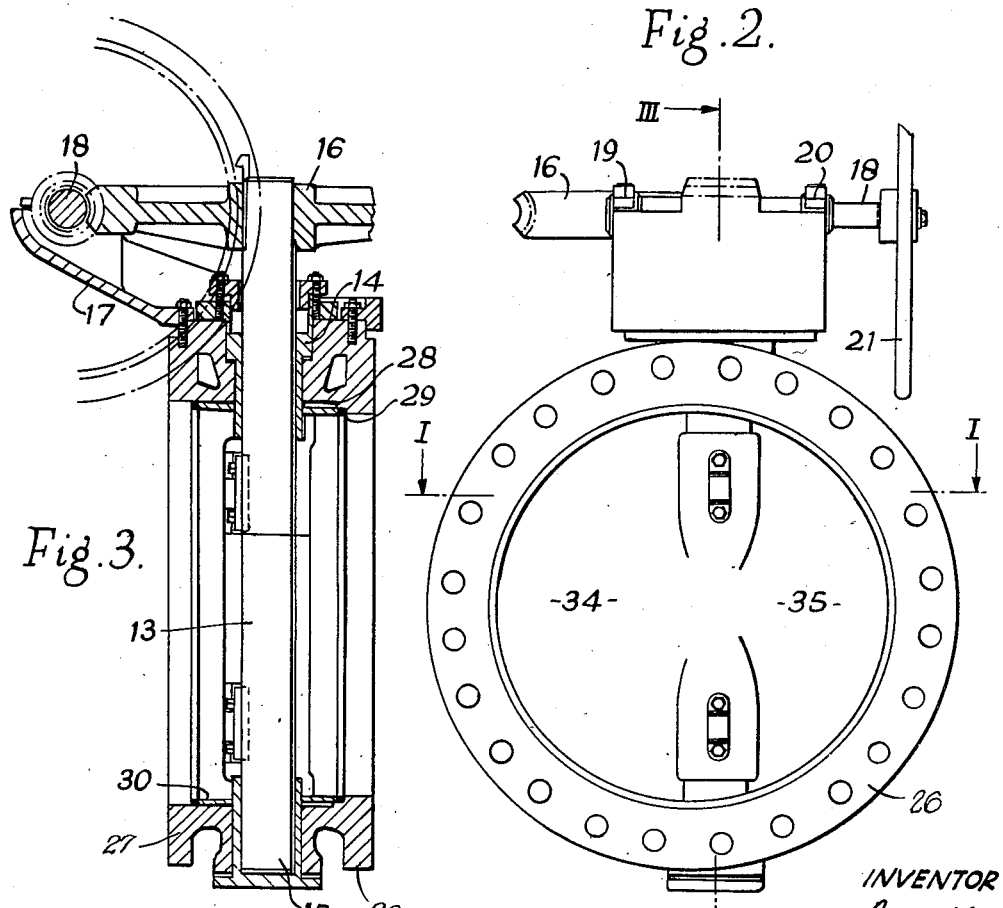

3,078,069
VALVES
Norman Broadbent, Fartown, Huddersfield, England, assignor to J. Blakeborough & Sons Limited
Filed Apr. 1, 1960, Ser. No. 19,396
4 Claims. (Cl. 251—173)

This invention relates to valves of the butterfly type in which the valve member comprises a disc pivotally mounted about an axis extending across the bore of the valve body so that it can be swung from a closed position across the said bore to an open position in an axial plane in the bore.

It is difficult to produce a butterfly valve which will form an effective seal between the valve member and the bore or valve seating at all points around the bore whilst still permitting free movement of the valve member during its opening and closing movements. The present invention is therefore designed to provide a butterfly valve which can be tightly closed but in which the valve member can move freely when operating.

Another object of the invention is the provision of a butterfly valve, which, whilst it provides an effective seal, has hydraulic and operating characteristics which closely approximate to those of a conventional butterfly valve. It should here be explained that in a conventional butterfly valve, the valve spindle usually has its axis on a diameter of the valve bore, and within the facewidth of the valve member periphery. With such a conventional valve, the sealing face must stop at each side of the shaft where the latter emerges from the valve member, in other words, the sealing face consists of two almost semicircular faces separated at their ends by the shaft. This, of course, allows leakage around the shaft. The sealing face of the valve member cannot (in conventional valves) be carried round the shaft, because then the parts of the sealing face in the axial plane of the valve axis (which parts would have to be at the full valve bore radius) would be trying to move into a chord of the valve bore smaller than the diameter, and this is impossible.

According to the invention a butterfly valve body has a part conical bore serving as the valve seating, the valve member is substantially circular and is mounted on a shaft parallel with but offset from a diameter of the bore and is arranged so that its periphery engages with the seating bore when the valve member is inclined to a plane at right angles to the seating cone axis of the bore. In order to provide an effective seal adjacent to the shaft, the valve member has no cut-away portions but its periphery is continuous and passes around one side of the shaft.

The valve seating may be a separate member having a straight tapered bore and adapted to be mounted within a valve body. For a valve intended for hot working conditions, the said seating member may comprise a thin flexible liner welded within the valve body, but so arranged that pressure fluid can enter a space between the outer surface of the liner and the valve body when the valve is closed whereby the liner will tend to be contracted into tight engagement with the valve member. For cold working conditions it is preferred that the valve seating member is of rigid construction, e.g. of solid bronze having a straight tapered bore which provides the seating surface for the valve member.

A butterfly valve constructed according to the invention will now be described by way of example, with reference to the accompanying drawings in which:

FIGURE 1 is a section of a valve along the line I—I in FIGURE 2,

FIGURE 2 is an end view of the valve,

FIGURE 3 is a section along the line III—III in FIGURE 2,

Figure 4:
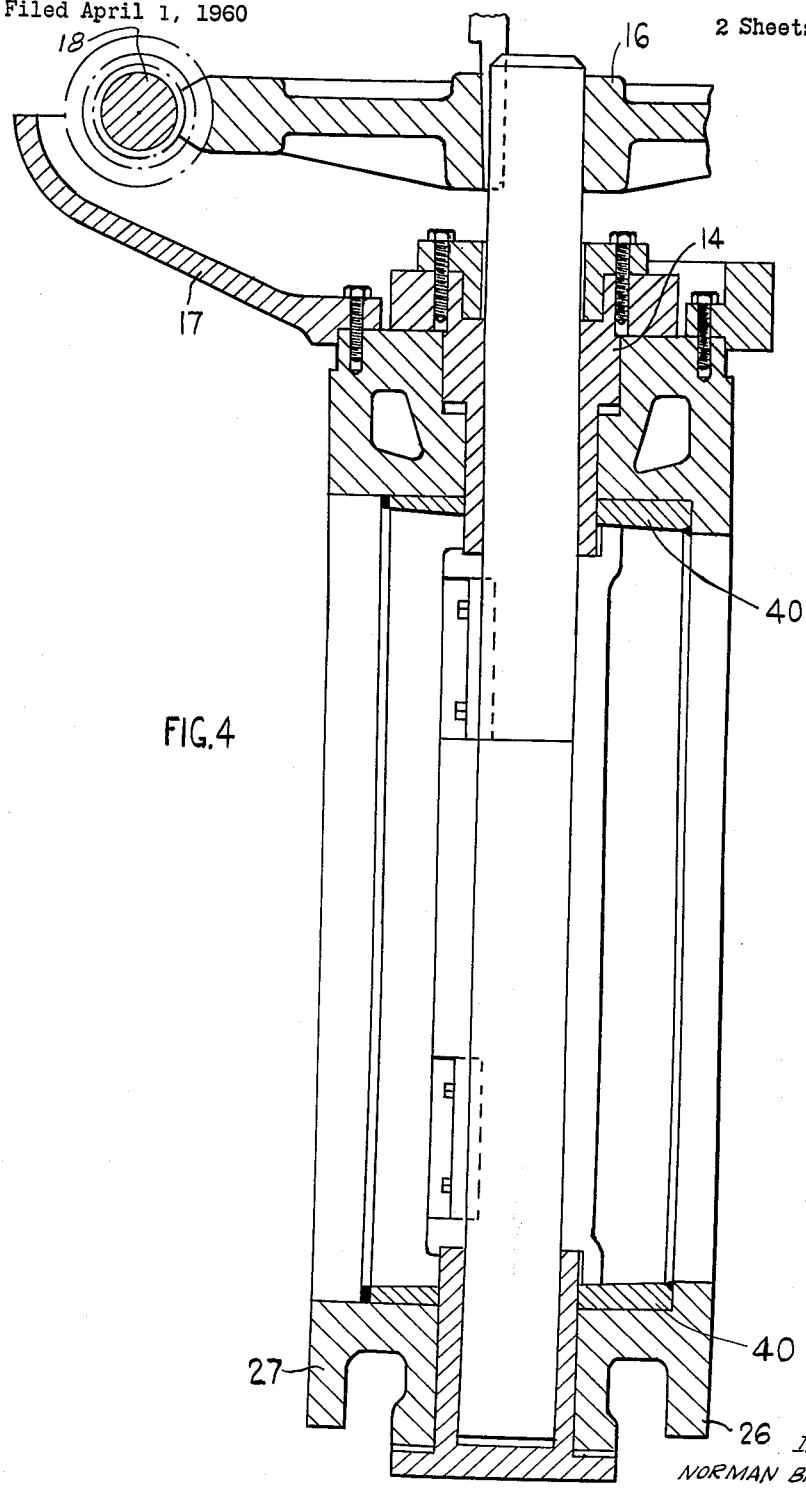
FIGURE 4 is a section similar to FIGURE 3, but showing an alternative construction.

Referring to FIGURES 1 to 3 of the drawings the valve comprises a body 10 having a fluid passage 11 which can be closed by a valve member 12 mounted for rotation on a shaft 13 within the valve body. The shaft 13 extends across the fluid passage 11 of the valve and is mounted in bearings 14 and 15 in the valve body. A valve actuating mechanism is mounted on the valve body and includes a wormwheel 16 mounted on a portion of the shaft 13 which extends through the valve body 10. A bracket 17 is mounted on the valve body 10 and this supports a shaft 18 in bearings 19 and 20, the shaft 18 carrying a handwheel 21 at one end and a worm 22 at the other end, the worm 22 engaging with the wormwheel 16. Rotation of the handwheel 21 thus causes rotation of the worm and wormwheel which in turn rotate the valve member 12, to open or close the valve.

Referring to FIGURE 1 of the drawings, the valve body 10 comprises a cylinder having external flanges 26 and 27 at each end for connection to pipes or apparatus with which the valve is to be used. The valve body also has a shallow internal shoulder 28 at one end, this internal shoulder 28 having a rebate 29 at its inner edge to accommodate the smaller diameter end of a straight tapered liner 30, the larger end of which fits the bore of the valve body adjacent to the end opposite the internal shoulder 28.

The valve member 12 is substantially circular, its opposite faces 31 and 32 are convex, and it has a bore parallel with but offset relatively to, its diameter. The shaft 13 passes through the bore, and is in itself parallel with but offset relatively to the diameter of the tapered liner 30 as shown in FIGURES 1 and 2. The shaft 13 is keyed inside the bore, as shown at 33 in FIGURE 1, so that the valve member will turn with the shaft 13. It will be seen, therefore, that there is a major portion 34 of the valve member 12 at one side of the shaft 13 and a minor portion 35 at the other side. The valve member 12 is proportioned so that when in its closed position engaging with the liner 30 it will be inclined to a plane at right angles to the axis of the liner 30 and passing through the axis of the shaft 13, the major portion 34 of the valve member 12 being at the larger diameter side of the said plane and the minor portion 35 of the valve member being at the smaller diameter side of the plane. When moving to its open position the major portion 34 of the valve member 12 swings towards the larger diameter of the liner 30, and the minor portion 35 swings towards the smaller diameter of the liner.

The peripheral portion of the valve member 12 is continuous and is adapted to have uninterrupted engagement with the liner 30 when the valve is closed. This is possible on account of the offsetting of the shaft 13, the inclination of the valve member 12 in the closed position, and the formation of the peripheral portions of the valve member 12 adjacent to the shaft 13, in that the said peripheral portions extend around that side of the shaft 13 facing the smaller diameter end of the liner 30 when the valve member 12 is in its closed position. By arranging the parts in this manner, the peripheral portions extending around the shaft will engage with the liner 30 when the valve is closed, but they will swing out of such engagement when the valve member is moved towards its open position.

The axis of the shaft 13 lies within the facewidth of the two semi-circular portions of the periphery of the valve member. The valve member can be regarded as a disc which has its sides inclined to a plane at right angles to the cone axis of the bore, and the shaft axis lies within the thickness of this disc. With this disposition of the shaft, it is only possible to open the valve if the shaft is offset from the diameter of the bore, and the bore is tapered.

As the liner 30 is tapered and is of constant thickness there will be an annular space between it and the bore of the valve body, the width of the said space decreasing from the smaller end of the liner to the larger end. Preferably the liner will be slightly flexible and the said annular space will be open to the pressure side of the valve whereby when the valve is closed the pressure in the annular space will tend to press the liner into tight engagement with the valve member.

The fluid under pressure may be fed to the annular space through a supply pipe 36 in which an inlet valve 37 is interposed, and the fluid pressure may be relieved by opening a relief valve 38 when the valve is to be opened. This arrangement is preferred for use with hot fluids. For cold conditions, it is preferred that a rigid liner having a tapered bore should be used, for example a liner made of Phosphor bronze. A valve provided with a rigid liner 40 is shown in FIGURE 4. Apart from the shape of the liner this valve is identical with that described above with reference to FIGURES 1 to 3.

In the particular construction described above, the valve member is arranged to be inclined approximately 5 degrees to a plane at right angles to the bore when in the closed position, but the degree of inclination may be varied according to requirements.

I claim:
1. A butterfly valve for controlling fluid flow comprising means defining a straight tapered bore, serving as a valve seating, a valve shaft, means mounting said valve shaft within said bore defining means with its longitudinal axis offset from but parallel with a diameter of said straight tapered bore, a substantially circular valve member, means mounting said valve member on said shaft, for partial rotation about the longitudinal axis of said shaft, a continuous sealing face formed on the periphery of said valve member and having two semi-circular parts one on each side of said shaft, said semi-circular parts of said sealing face being joined at their ends by shaft circumventing parts of said sealing face, which shaft circumventing parts are both disposed to lie on that side of said shaft which faces towards the smaller diameter end of said straight tapered bore when said valve member is in the closed position, said valve member mounting means being further arranged so that said longitudinal axis of said shaft lies within the width of said valve member, said valve member being of such a diameter that said sealing face engages with said straight tapered bore to form a complete seal with said straight tapered bore, when the ends of that diameter of said valve member which is at right angles to said shaft longitudinal axis are displaced axially relatively to each other.

2. A butterfly valve for controlling fluid flow comprising means defining a straight tapered bore, serving as a valve seating, a valve shaft, means mounting said valve shaft within said bore defining means with its longitudinal axis offset from but parallel with a diameter of said straight tapered bore, a valve disc, means mounting said valve disc on said shaft for partial rotation about the longitudinal axis of said shaft, a continuous sealing face formed on the periphery of said disc and on two shaft circumventing parts fixed to said disc, said shaft circumventing parts being both disposed to lie on that side of said shaft which faces towards the smaller diameter end of said straight tapered bore when said valve disc is in the closed position, said disc mounting means being further arranged so that said longitudinal axis of said shaft lies within said disc, said disc being of such a diameter that said sealing face engages with said straight tapered bore to form a complete seal with said bore, when the sides of said disc are inclined to a plane at right angles to the cone axis of said straight tapered bore.

3. A butterfly valve for controlling fluid flow comprising a valve body, a liner made of relatively thin flexible material, located in said body so as to enclose an annular space between said liner and said body, said liner having a straight tapered bore from end to end thereof to serve as a valve seat, a valve shaft, means mounting said valve shaft within said straight tapered bore defining means with its longitudinal axis offset from but parallel with a diameter of said straight tapered bore, a substantially circular valve member, means mounting said valve member on said shaft for partial rotation about the longitudinal axis of said shaft, a continuous sealing face formed on the periphery of said valve member and having two semi-circular parts one on each side of said shaft, said semi-circular parts of said sealing face being joined at their ends by shaft circumventing parts of said sealing face, which shaft circumventing parts are both disposed to lie on that side of said shaft which faces towards the smaller diameter end of said straight tapered bore when said valve member is in the closed position, said valve member mounting means being further arranged so that said longitudinal axis of said shaft lies within the width of said valve member, said valve member being of such a diameter that said sealing face engages with said straight tapered bore to form a complete seal with said straight tapered bore, when the ends of that diameter of said valve member which is at right angles to said shaft longitudinal axis are displaced axially relatively to each other, and valve controlled conduit means for connecting said annular space with the pressure side of said valve member.

4. A butterfly valve for controlling fluid flow comprising a valve body, a liner made of relatively thin flexible material, located in said body so as to enclose an annular space between said liner and said body, said liner having a straight tapered bore from end to end thereof to serve as a valve seat, a valve shaft, means mounting said valve shaft within said straight tapered bore defining means with its longitudinal axis offset from but parallel with a diameter of said straight tapered bore, a valve disc, means mounting said valve disc on said shaft for partial rotation about the longitudinal axis of said shaft, a continuous sealing face formed on the periphery of said disc and on two shaft circumventing parts fixed to said disc, said shaft circumventing parts being both disposed to lie on that side of said shaft which faces towards the smaller diameter end of said straight tapered bore when said valve disc is in the closed position, said disc mounting means being further arranged so that said longitudinal axis of said shaft lies within said disc, said disc being of such a diameter that said sealing face engages with said straight tapered bore to form a complete seal with said bore, when the sides of said straight tapered disc are inclined to a plane at right angles to the cone axis of said bore.

References Cited in the file of this patent
UNITED STATES PATENTS

| | | |
|---|---|---|
| 1,744,798 | Price | Jan. 28, 1930 |
| 1,834,870 | Rogers | Dec. 1, 1931 |
| 2,187,243 | Langhaar | Jan. 16, 1940 |
| 2,673,708 | Danks | Mar. 30, 1954 |

FOREIGN PATENTS

| | | |
|---|---|---|
| 63,335 | Sweden | 1926 |
| 184,011 | Austria | Dec. 10, 1955 |